US007433858B2

(12) United States Patent
Rehberg et al.

(10) Patent No.: US 7,433,858 B2
(45) Date of Patent: Oct. 7, 2008

(54) RULE SELECTION ENGINE

(75) Inventors: Charles Patrick Rehberg, Nashua, NH (US); Steve Sherwood Porter, Sterling, MA (US)

(73) Assignee: Trigent Software Inc., Natick, MA (US)

( * ) Notice: Subject to any disclaimer, the term of this patent is extended or adjusted under 35 U.S.C. 154(b) by 161 days.

(21) Appl. No.: 10/765,461

(22) Filed: Jan. 26, 2004

(65) Prior Publication Data

US 2005/0165707 A1 Jul. 28, 2005

(51) Int. Cl.
G06F 17/00 (2006.01)
G06N 5/00 (2006.01)
G06N 5/02 (2006.01)
(52) U.S. Cl. .............................. 706/47; 706/45; 706/50
(58) Field of Classification Search .................. 706/45, 706/50, 55, 47, 61, 59; 395/52
See application file for complete search history.

(56) References Cited

U.S. PATENT DOCUMENTS

| | | | | | |
|---|---|---|---|---|---|
| 4,649,515 | A | * | 3/1987 | Thompson et al. ............ | 706/52 |
| 5,140,671 | A | * | 8/1992 | Hayes et al. .................. | 706/60 |
| 5,179,632 | A | * | 1/1993 | Masui et al. .................. | 706/47 |
| 5,228,116 | A | * | 7/1993 | Harris et al. .................. | 706/50 |
| 5,263,127 | A | | 11/1993 | Barabash et al. | |
| 5,353,385 | A | | 10/1994 | Tano et al. | |
| 5,517,642 | A | * | 5/1996 | Bezek et al. .................. | 707/3 |
| 5,642,471 | A | | 6/1997 | Paillet | |
| 6,151,697 | A | * | 11/2000 | Moeller ....................... | 714/759 |

OTHER PUBLICATIONS

International Searching Authority "Notification of Transmittal of International Search Report", PCT/US05/02396, Jun. 27, 2006.
Doorenbos, "Production Matching for Large Learning Systems", Computer Science Department, Carnegie Mellon University, Pittsburgh, PA, Jan. 31, 1995.
Gordin et al., "Set-Oriented Constructs: From Rete Rule Bases to Database Systems".
Hanson et al., "An Overview of Production Rules in Database Systems", *The Knowledge Engineering Review*, 8(2):121-143 (1993).
Nayak et al., "Comparison of the Rete and Treat Production Matchers for Soar (A Summary)".
Tambe et al., "Uni-Rete: Specializing the Rete Match Algorithm for the Unique-attribute Representation", pp. 1-30.
Wallis et al., "Efficient Forward Chaining for Declarative Rules in a Multi-Agent Modelling Language", Center for Policy Modelling, Manchester Metropolitan University, UK, Oct. 21, 1994.

* cited by examiner

*Primary Examiner*—Joseph P Hirl
(74) *Attorney, Agent, or Firm*—Occhiuti Rohlicek & Tsao LLP

(57) ABSTRACT

A rules-based system makes use of a specification that is similar to those used in earlier systems, such as in OPS5, but does not require the computational complexity of implementations such as Rete. In some such implementations, matching of the applicable rules given a set of facts is simplified by providing preallocated storage locations for the Boolean values of the condition elements for each rule. The Boolean values are set by direct processing of each of the facts. These preallocated storage locations are arranged to allow efficient evaluation of the overall condition of each of the rules in a manner that is significantly more efficient than implementations of earlier rule-based systems.

4 Claims, 4 Drawing Sheets

RULE SELECTION ENGINE

BACKGROUND

This invention relates to rules-based software systems.

One approach to the design of artificial intelligence systems has been to use a rules-based approach. In rules-based systems, a set of rules (or "productions") defines the behavior of the system. Rules are selected based on specifications of the rules and the state of information that is known to the system about a particular problem. Selected rules are applied. Application of the rules in general changes the state of information, thereby potentially allowing further rules to be selected. Generally, rules-based systems in which information is repeatedly added to the state of information, thereby allowing further rules to be applied until a desired result is achieved or until there are no remaining applicable rules, are referred to as "forward-chaining" rules-based systems.

One well-known rules-based system is the OPS5 system, which was developed at Carnegie Mellon University in the early 1980's and later commercialized by a number of companies. In OPS5, the state of information is represented as a set of facts (or "working memory elements," "WMEs"). Facts belong to identified classes, and each fact (an instance of a class) assigns values to a number (zero or more) attributes for that class. In general, a fact takes the form "(identifier ^attribute1 value1 ^attribute2 value2 . . . )" where "identifier" is the name of a class, and "attribute1, "attribute2", etc. are names of attributes for that class. An example of a fact could be "(person ^height 6.0 ^weight 210)" for a person (an instance of a class named person) whose height is 6.0 feet and weight is 210 pounds.

Each rule (production) has the form "LHS condition - - ->RHS action", where the left-hand-side (LHS) condition on the state of information under which the rule is applicable and the right-hand-side (RHS) action specifies the operations to perform when applying the rule. This condition is a Boolean expression that combines a number of terms with logical operators. The logical operators are AND and ANDNOT, and each of the terms is referred to as a condition element. Each condition element is a logical function of the value or values of specified attributes for an identifier, for example, the attribute having a particular value or belonging to a specified set of values, not having a particular value, not belonging to a specified set, etc. A condition element is represented as "(identifier ^attribute value)" if the identifier/attribute must have the specified value, and as "(identifier ^attribute<<value1 value2 . . . >>)" if the identifier/attribute must belong to the specified set of values. A condition element can be a logical function or a combination of multiple attributes. For example such a combination can be represented as "(person ^weight>200 ^height<6.0)" to indicate that the weight attribute must be greater than 200 and the height attribute less than 6.0. A condition element is evaluated to be true for a fact if that fact includes attribute/value pairs that together determine that the overall logical function is true. Each condition element of a rule can match a different fact, and a rule's condition is true if the logical combination of the condition elements is true for a particular set of facts. Some systems such as OPS5 allow the values in condition elements to be variables that must be bound to the same value in each of the condition elements of a rule's condition that together match a particular rule.

An action of a rule can include one or more separate actions, each of which can modify the state of information, for example, by adding a fact with particular attributes, or by removing or modifying an existing fact. Execution proceeds in a loop where first one or more applicable rules are identified along with the facts that make them applicable, then one of these rules is selected, and then the action of that selected rule is performed.

The task of identifying applicable rules and the facts that make them applicable can be quite computationally expensive. One particular algorithm that is used in many implementations of forward-chaining rules-based systems, such as OPS5, is the Rete algorithm, originally developed by C. L. Forgy. The Rete algorithm uses a data flow network to represent the conditions of the rules. The network has two parts, one part performs the tests required to evaluate the individual condition elements, and a second part combines the condition elements to form the overall conditions for the rules. The outputs of the first part (and the input to the second part) are a set of memories each associated with a different condition element for holding the set of facts that satisfy (or may satisfy for some values of the variables) that condition element. The second part includes storage elements associated with different combinations of condition elements, each identifying the possible corresponding combinations of facts that satisfy that combination of condition elements. Some of these storage elements are associated with overall conditions that particular rule must satisfy, and the presence of any combination of facts in these storage elements indicate that the corresponding rules are applicable given those facts.

SUMMARY

In a general aspect, the invention features a rules-based system that makes use of a specification that is similar to those used in earlier systems, such as in OPS5, but does not require the computational complexity of implementations such as Rete. Some implementations of the invention do not necessarily perform the same processing as earlier systems. For example, they may not require that a rule be repeatedly applied if the condition is satisfied for multiple different sets of facts, the action of each rule are independent of the facts that enabled the rule, and/or variables are not used in the rule conditions. In some such implementations, matching of the applicable rules given a set of facts is simplified by providing preallocated storage locations for the Boolean values of the condition elements for each rule. The Boolean values are set by direct processing of each of the facts. These preallocated storage locations are arranged to allow efficient evaluation of the overall condition of each of the rules in a manner that is significantly more efficient than implementations of earlier rule-based systems such as Rete implementations of OPS5.

In one aspect, in general, the invention features a method, and a related system and software for processing rules. A rules base that includes a set of rules is accepted by the system. Each rule includes a condition for application of the rule. The condition for a rule includes one or more condition element, and at least some of the conditions include multiple condition elements. The rule base is processed to form a data structure. The data structure includes, for each of the rules, storage locations for holding Boolean values of the condition elements of the conditions for that rule.

Implementations of the invention can include one or more of the following features.

A set of facts is processed by the system. This processing includes evaluating condition elements that depend on the facts, and storing results of evaluating the condition elements in the storage locations in the data structure for holding the values of the condition elements.

The data structure links each fact to corresponding condition elements that depend on that fact.

Processing the facts includes determining applicable rules based on the accepted facts by identifying condition elements that depend on the accepted facts using the data structure.

The data structure includes, for each of the rules, data values corresponding to the storage locations for the values of the condition elements. These data values represent a logical combination of condition elements.

Applicable ones of the rules are identified using the data values representing the logical combination of the condition elements and values stored in the storage locations for storing values of the condition elements.

Implementations of the invention can have one or more of the following advantages.

Representation of the values of condition elements in a compact data structure, such as a bit vector, can enable efficient evaluation of the conditions for rules making use of the condition element. Using a corresponding compact data structure to represent the logical combination for the condition elements can further increase efficiency in the evaluation.

Compiling multiple rule bases into data structures that can be loaded into memory, for example, using stored memory images, enables efficient selection and/or switching of rule sets for processing different sets of facts.

The storage requirements for the approach do not necessarily grow as more facts are processed.

The links in the data structure provide an efficient mechanism for identifying applicable rules without requiring searching.

Other features and advantages of the invention will be apparent from the following description, drawings, and claims.

DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
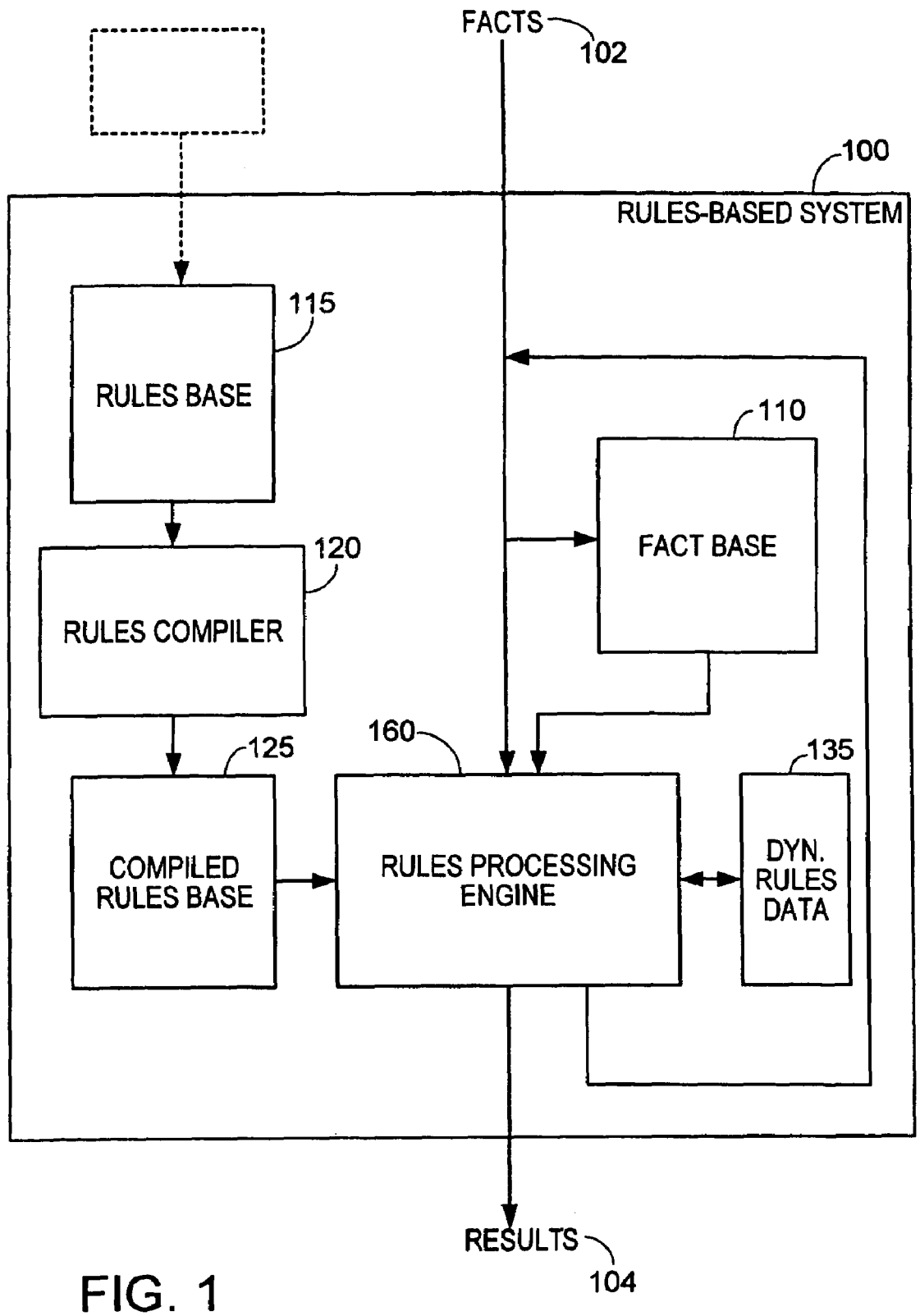
FIG. 1 is a block diagram of a rules-based system.

Referring to FIG. 1, a rules-based system 100 accepts one or more external facts 102 and produces results 104 based on processing of the facts according to a rule base 115. The accepted facts 102 are maintained in a fact base 110, and rules base and fact base are processed by a rules processing engine 160. The rules base 115 includes a number of separate rules. Each of these rules specifies a condition that determines whether the rule is applicable based on the contents of the fact base 110. Each rule also specifies actions to take when the rule is applied. These actions can include modification of the fact base 110 and providing results 104 from the system 100.

Prior to processing the external facts 102, the rules-based system 100 processes the rules base 115 using a rules compiler 120 to produce a compiled rules base 125. The compiled rules base includes a static data structure representing the rules in the rules base 115, as well as corresponding dynamic rules data 135 that includes storage locations for working data that is produced by the rules processing engine when it processes the external facts 102.

As facts are added to the fact base, or as the fact base is modified based on the application of rules, rules may become applicable, and previously applicable rules may cease to be applicable. The rules processing engine 160 identifies applicable rules and performs the specified actions of those rules. To the extent that external facts 102 do not continue to be added to the system, the process in general terminates when all the applicable rules have been applied.

Each fact 102 is represented by an identifier and one or more attribute-value pairs, which are denoted "(identifier ^attribute1 value1 ^attribute2 value2 . . . )," using a notation that is related to that used in the OPS5 system. The combination of an identifier and an attribute is referred to as a "feature."

Each rule in the rule base 115 is specified in a manner that is similar to that used in the OPS5 system, and includes a specification of a condition under which the rule is applicable. This condition is a Boolean expression that combines a number of terms with logical operators. The logical operators are AND and ANDNOT, and each of the terms is referred to as a condition element. Each condition element is a logical function (i.e., a function producing a Boolean value of TRUE or FALSE) of the value or values of specified attributes for an identifier, for example, the attribute having a particular value or belonging to a specified set of values, not having a particular value, not belonging to a specified set, etc. A condition element is represented as "(identifier ^attribute value)" if the identifier/attribute must have the specified value, and as "(identifier ^attribute <<value1 value2 . . . >>)" if the identifier/attribute must belong to the specified set of values. A condition element can be a logical function or a combination of multiple attributes. For example such a combination can be represented as "(person ^weight>200 ^height<6.0)" to indicate that the weight attribute must be greater than 200 and the height attribute less than 6.0. A condition element is evaluated to be true for a fact if that fact includes attribute/value pairs that together determine that the overall logical function is true. Note that if an attribute that is not present in a fact its value is implicitly NIL.

The number of rules in the rule base 115 may be quite large, for example several hundred thousand in number. As introduced above, the rules processing engine 160 makes use of data structures in the compiled rules base 125 and the dynamic rules data 135 and procedures that access these data structures. These data structures enable efficiently searching for applicable rules.

Figure 2:
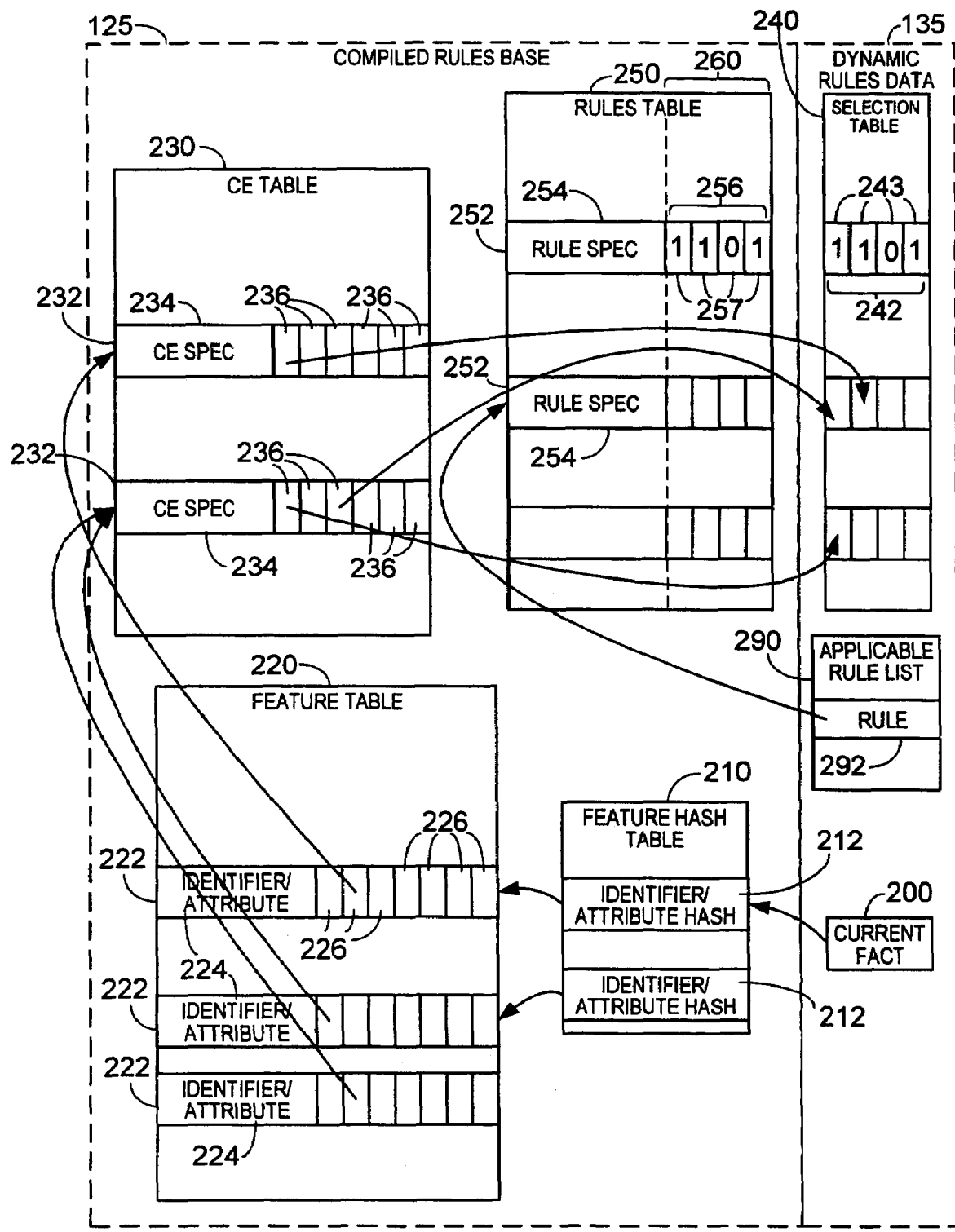
FIG. 2 is a data structure diagram.

Referring to FIG. 2, the rules processing engine 160 uses the compiled rules base 125 and the dynamic rules data 135 to determine which rules are applicable given a particular fact. A rules table 250 includes one entry (row) 252 for each rule in the rules base 115. A condition element (CE) table 230 includes one entry for each condition element that is used in a condition of some rule. Note that in general the same condition element can be used in multiple rules, and a common condition element can be combined with an AND in one rule's condition and with an ANDNOT in another rule's condition. A feature table 220 includes one entry 222 for each unique attribute/identifier pair upon whose value at least some condition elements depend. A feature hash table 210 maps a hash of an identifier/attribute pair to an entry 222 (if any) in the feature table 220 for that identifier/attribute pair. Finally, a selection table 240 includes one entry 242 corresponding to each of the entries in the rules table 250. Note that as described below, given a particular rule base 115, the rules table 250, the CE table 230, and the feature table 220 do not necessarily depend on the contents of the fact base 110, while the selection table 240 depends on the contents of the fact base 110 according to the processing performed by the rules processing engine 160 based on the rule base.

The data structure links features to condition elements that depend on values of these features using pointers that link the tables shown in FIG. 2. Each entry 122 of the feature table 120 includes a pointer 126 to the condition element entries 132 in the condition element table 130 for each condition element that depends on the value of the identifier/attribute value. Each condition element entry 132 of the condition element table 130 includes pointers 136 to storage locations 243 in the selection table 140 each of which is associated with a particular use of that condition element in a particular rule.

The data structure includes bit vectors that are used to determine if a rule's condition is satisfied. Each rule entry 252 of the rules table 250 includes a bit vector 156 that includes one bit for each of the condition elements in the condition for that rule. That is, if there are four condition elements that make up the condition for the rule, there are four bits in the bit vector 256. Each bit 242 of the bit vector indicates whether the condition element associated with that bit position is combined with an AND or and ANDNOT operation, with a 1 signifying AND and a 0 signifying ANDNOT. Each entry of the selection table 240 also includes a bit vector where each bit position 243 corresponds to a bit position in the bit vector 256 for the corresponding rule entry 152. That is, the first bit 243 of the bit vector 242 corresponds to the first bit 257 of the bit vector 256. The bits of the selection table provide storage locations that are set by the rules processing engine 160 with a 0 initial value and 1 indicating that the condition element evaluates to TRUE based on a fact 102 received by the system. The rules processing engine determines which rules are applicable by combining the bit vector 256 in the rule entry 252 with the corresponding bit vector in the entry 242 of the selection table 240. Specifically, the rules processing engine determines whether the bits are all equal in the bit vector 256 of a rule entry 252 to the bits in the selection bit vector 242 of the corresponding entry of the selection table 240.

Figure 3:
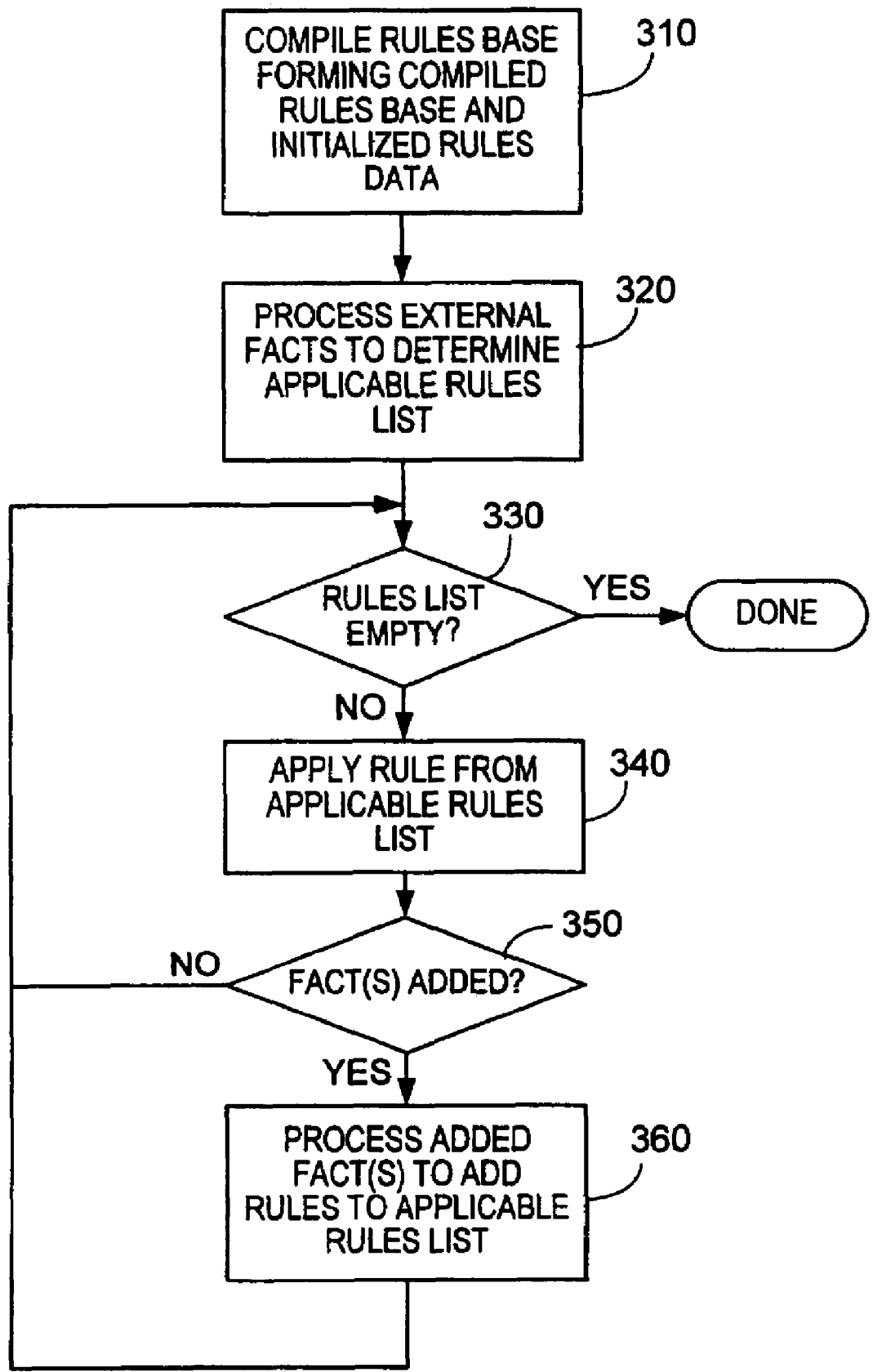
FIG. 3 is a flowchart of overall operation of the system.

Referring to FIG. 3, prior to processing the external facts 102 that are presented to the system, the system processes the rules base 115 with the rules compiler 120 to produce the data structures for the rules table 250, the CE table 230, the feature table 220, and the feature hash table 210, and the associated pointers that link the tables, as well as the empty (i.e., initialized to 0) storage bit vectors 242 of the selection table 240 (step 310). These data structures can be stored for later use in processing new streams of facts. That is, the compilation of the rule base 115 can be performed significantly earlier than processing of the facts 102, and compilation of different rule sets can allow selection of the particular rule set to apply for each of a series of different sets of facts 102.

Processing of a set of external facts 102 proceeds as follows (steps 330-360). Initially, an applicable rule list 290 is set to be empty. For each fact 102, that fact is added to the fact base 110, and the fact being processed by the rules processing engine 160 is stored in a storage element for the current fact 200. The engine determines whether to add or remove rules from the applicable rule list 290 according to the effect of the attribute values in the current fact.

Figure 4:
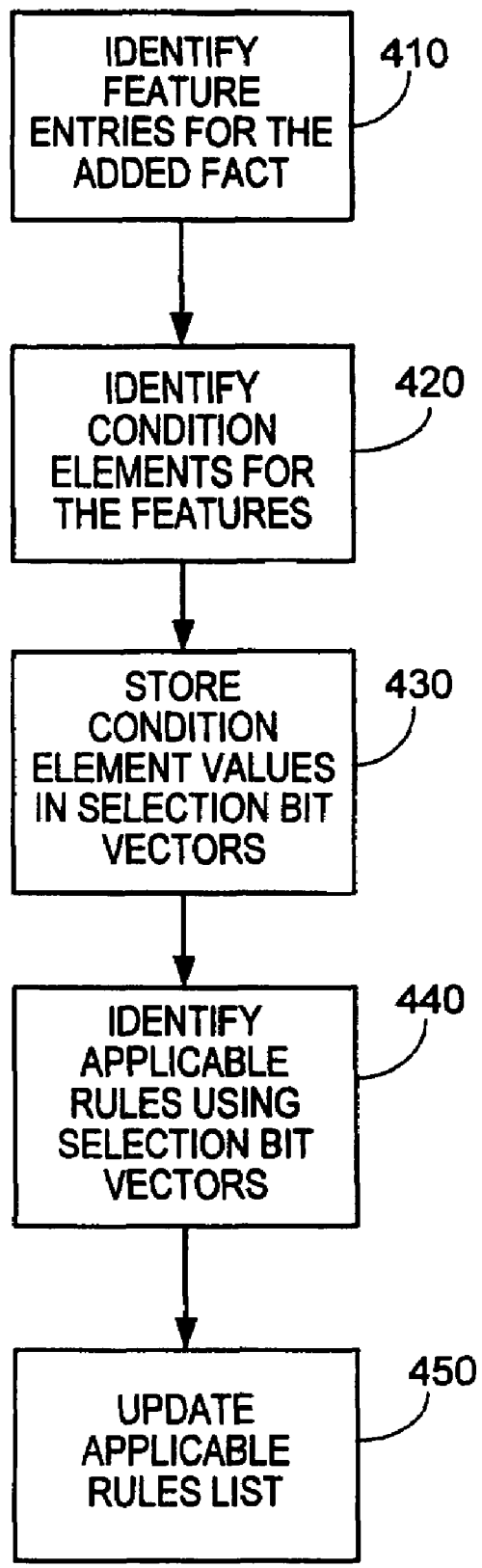
FIG. 4 is a flowchart of processing of an added fact.

Referring to FIG. 4, for each identifier/attribute represented in that fact, the engine determines if there is a corresponding entry 222 in the feature table 220 using the feature hash table 210 (step 410). If there is such a feature entry 222, the condition element entries 232 that depend on the value of the identifier/attribute are identified using the pointers 226 from the feature table 220 to the CE table 230 (step 420). This is repeated to identify all the condition elements that depend on some identifier/attribute of the current fact 200. For each of the condition elements that depends on the current fact, the condition element is evaluated using the condition element specification 234 and the attribute values of the current fact 200. Note that the condition element may depend on multiple ones of the attributes of the current fact. The result of evaluating the condition element is then entered in the corresponding bit locations of the selection table 240 that are determined by the pointers 236 linking the CE table with the selection table (step 430). Each time a bit is updated in one of the bit vectors 242 of the selection table 240 the bit vector is compared with the bit vector 256 of the corresponding rule entry 252 (step 440). If the bit vectors are equal, then an entry 292 is added to the applicable rule list 290, unless an entry for that rule is already in the list (step 450). If the bit vectors are not equal, then if the applicable rule list includes an entry for that rule, it is removed from the applicable rule list.

Referring back to FIG. 3, having constructed the applicable rule list 290 based on the facts 102 that were provided to the system 100, if the applicable rules list is not empty (step 330) the rules processing engine then selects one (e.g., in sequence or in an arbitrary order) of the applicable rules from the set of applicable rules, removes the rule entry 292 for that rule from the applicable rule list 290 and performs the actions specified by the rule specification 254 of that rule (step 340). An action of the rule can result in a fact being added to the fact base 110. If such a fact or facts are added (step 350) further processed by the rules processing engine 160 following the same process as described above for added external facts (step 360). That is, the rules processing engine determines which identifier/attribute pairs of the added fact are represented in the features table, and for each of these identifier/attributes, it locates the condition element entry that makes use of that identifier/attribute and evaluates that condition element. If the condition for a rule whose condition uses that condition element evaluates to true, the rule is added to the applicable rule list 290 if not already present and if the condition evaluates to false, the rule is removed from the applicable rule list if it is present. Having processed the actions for the rule selected from the applicable rule list 290, the rules processing engine repeats the procedure by selecting another rule from the list until the list is empty (step 330).

In the description above, the bit vectors 256 in the rules table 250 and the bit vector entries 242 in the selection table 240 are described as using single bits associated with each of the condition elements that are used in the condition of the corresponding rule. Use of single bits enables an efficient comparison of the two bit vectors, for example, using a single machine instruction for bit vectors with the number of bits being less than or equal to the word-length of the instruction set architecture being using to implement the engine. Alternatively, other efficient encodings of the information in the bit vector 256 and selection vector 242 can be used, for example, using a single byte, word, or other size of data element associated with each condition element. In such alternatives, the comparison may not be accomplished using a single machine instruction but may nevertheless be very efficient, for example, using an efficiently implemented loop of instructions.

The various "tables" shown in FIG. 2 are not necessarily implemented as arrays of fixed-length records. For example, each entry of each of the tables can be stored as one or more data items linked by pointers. This enables different sizes of bit vectors 256 and 242 for different rules.

Various pointers of the data structure, for example pointers 226 and 236, are not necessarily stored as memory addresses into a memory in which the data structure is stored. For example, these pointers may be relative memory addresses, record offsets, record indexes, or other forms of data that enable efficient access to the destination of the pointer.

The bit vector 256 of each rule entry 252 is not necessarily required, for example, if condition elements must be combined with a single operator, such as with an AND operator. Furthermore, more complex logical combinations of condition elements may be supported while maintaining efficient representation of the required combinations of the condition elements and the evaluated values of those condition elements.

The storage locations of the selection table 240 are not necessarily preallocated. For example, the storage locations in a bit vector 242 for an entry for a condition element may be allocated on the first occurrence of a feature upon which the condition element depends.

In one application of this approach, multiple sets of facts 102 are to be processed, each set with a corresponding rules base from a variety of different rules bases. For each of the rules bases, the rules compiler is used ahead of time to form the compiled rules base 125 and corresponding initialized dynamic rules data 135. The compiled rules base and the initialized dynamic rules data are then stored for later use. For each set of facts, the system loads the corresponding compiled rules base 125 and initialized dynamic rules data 135. For example, the compiled rules base and the initialized dynamic rules data are stored as memory images that can be loaded efficiently into memory of the computer hosting the rules processing engine. If successive sets of facts use the same rules base, only the initialized dynamic rules data 135 needs to be reloaded before processing the facts because the compiled rules base does not change with processing of facts.

The rules base is not necessarily represented explicitly. For example, a rules base may itself result from the compilation of another form of information structure, which may be other forms of rules or constraints applicable to a particular application domain. In such a case, this other form of information structure may be compiled directly into the data structures of the compiled rules base and dynamic rules data without necessarily explicitly representing the rules base. The formation of the data structures may not require a rules compiler. For example, a text representation of the rules can be loaded into the system and an in-memory representation of the data structures built during that load Alternative versions of the system can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Many other implementations of the invention other than those described above are within the invention, which is defined by the following claims.

What is claimed is:

1. A computer-implemented method for processing rules, the method comprising:

providing a static data structure (125) and a dynamic data structure (135) for processing rules,
wherein the static data structure represents rules in a rules base and the dynamic data structure includes storage locations for working data produced by processing external facts according to the rules represented in the static data structure,
wherein each rule in the rules base is specified according to a set of condition elements, and for each rule the static data structure includes a data vector (256) for said rule such that each element (257) of said vector is associated with a different one of the condition elements according to which the rule is specified, and
the dynamic data structure includes a corresponding vector of storage locations (242) for said rule such that each storage location (243) of said vector corresponds to a different one of the elements (257) of the data vector (256) for said rule in the static data structure (125) and is associated with a different one of the condition elements according to which the rule is specified;

processing a plurality of facts, including accepting a current fact (200) and storing values resulting from evaluation of condition elements that depend on the current fact in storage locations (243) of the dynamic data structure (135) associated with said condition elements; and determining whether a rule of the rules base is applicable by comparing the elements (257) of the data vector (256) in the static data structure (125) for said rule with the values stored in the corresponding storage locations (243) in the dynamic data structure (135) for said rule.

2. The method of claim 1 wherein each data vector (256) comprises a bit vector such that each element (257) of the bit vector for a rule in the static data structure (125) is represented as a single bit and each vector of storage locations (242) comprises a storage bit vector such that each storage location (243) of the storage bit vector in the dynamic data structure consists of a single bit location; and wherein comparing the elements (257) of the data vector (256) for a rule with the values stored in the vector of storage locations (242) in the dynamic data structure (135) for said rule comprises comparing two bit vectors.

3. The method of claim 1 wherein the static data structure (125) further includes a condition element table (230) that includes a plurality of condition element entries (232) such that each condition element entry is associated with a condition element and identifies one or more storage locations (243) in the dynamic data structure (135) that are associated with said condition element; and wherein processing the plurality of facts further includes identifying the storage locations (243) for storing the values resulting from evaluation of the condition elements using condition element entries (232) of the condition element table.

4. The method of claim 1 wherein the static data structure (125) further includes a feature table (220) that includes a plurality of entries (222) such that each entry is associated with a different identifier/attribute and includes one or more elements (226) that each identifies a condition element represented in the static data structure (125) that depends on said identifier/attribute; and wherein processing the plurality of facts further includes determining entries (222) of the feature table (220) associated with the current fact and determining condition elements for evaluation according to the elements (226) of said entries (222).

* * * * *